United States Patent [19]

Kuzarov

[11] 4,033,552

[45] July 5, 1977

[54] WINCH AND METHOD OF ASSEMBLING THE SAME

[75] Inventor: Encho Janaki Kuzarov, Milwaukie, Oreg.

[73] Assignee: Warn Industries, Inc., Kent, Wash.

[22] Filed: Sept. 23, 1975

[21] Appl. No.: 615,936

[52] U.S. Cl. .................................. 254/166; 29/434; 29/469; 242/54 R; 254/186 R; 403/319; 403/353

[51] Int. Cl.² .......................................... B66D 3/00

[58] Field of Search ....... 254/187 R, 187 C, 186 R, 254/181, 166; 403/353, 355, 315, 319; 242/45 R; 29/434, 469; 74/606

[56] References Cited

UNITED STATES PATENTS

| | | | |
|---|---|---|---|
| 3,148,556 | 9/1964 | Gibbs et al. ................. | 74/606 X |
| 3,186,081 | 6/1965 | Barisch ........................ | 29/469 X |
| 3,543,593 | 12/1970 | Haaker et al. ................. | 74/606 X |
| 3,814,491 | 6/1974 | Kackley ........................ | 403/353 X |

FOREIGN PATENTS OR APPLICATIONS 1,209,298   3/1960   France .................... 254/187 R

*Primary Examiner*—Robert J. Spar
*Assistant Examiner*—Donald W. Underwood
*Attorney, Agent, or Firm*—Graybeal, Barnard & Uhlir

[57] ABSTRACT

A winch mounted to an automobile bumper and comprising a cable winding drum rotatably mounted between a main drive housing and an opposite end idler housing. The main drive housing has a main lower section of integral box-like construction and an open top closed by an upper housing section. The drive end of the drum and an intermediate drive member are inserted laterally into the lower housing through access openings, and are retained in place by a downwardly inserted retaining plate. The remaining drive components are inserted into the lower housing section through the top opening or positioned in the upper housing section. This construction provides for easy assembly of the drive components, with box-like construction of the main housing being better able to withstand the substantial force loads exerted thereon.

17 Claims, 12 Drawing Figures

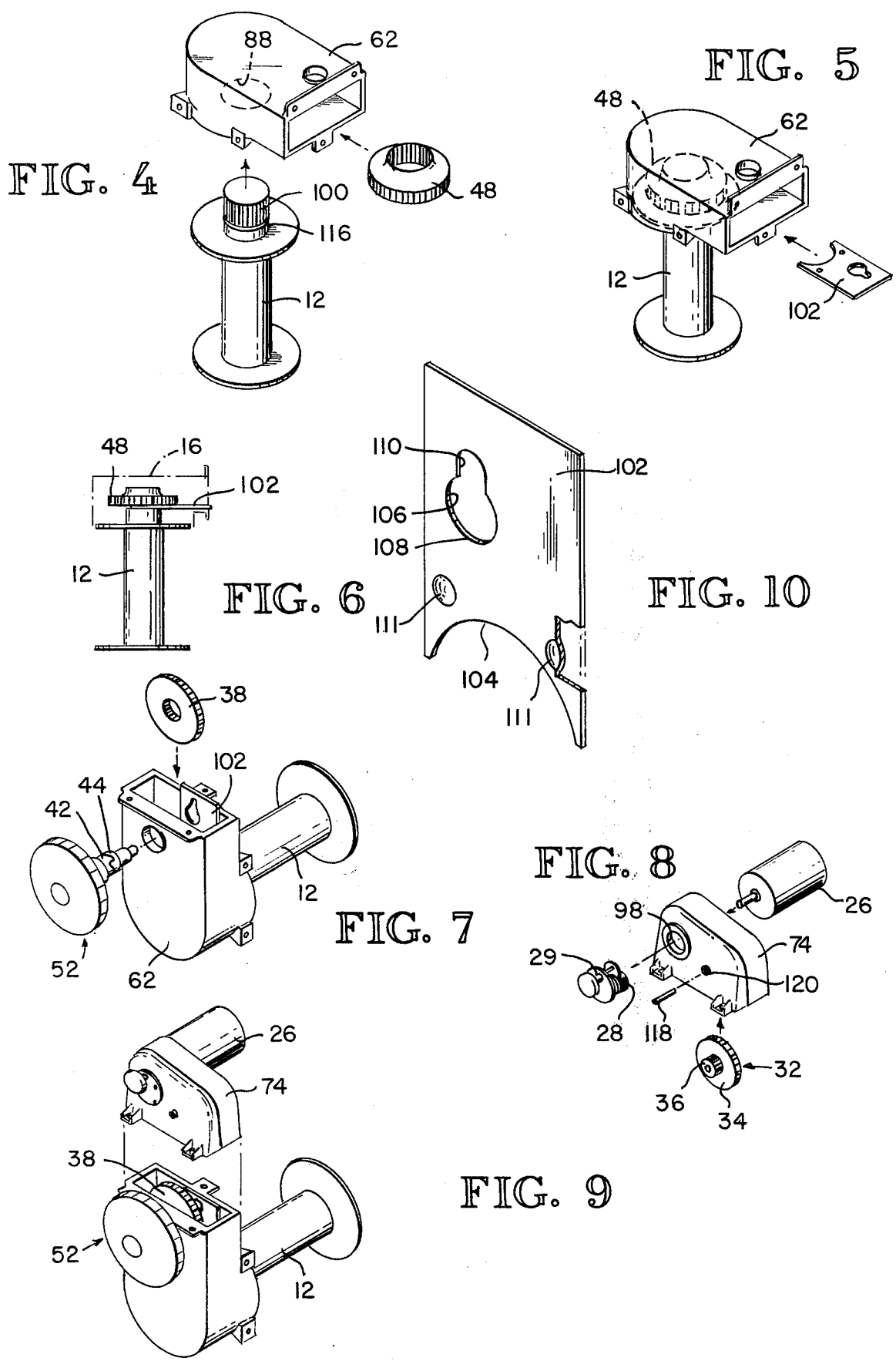

WINCH AND METHOD OF ASSEMBLING THE SAME

BACKGROUND OF THE INVENTION

1. Field of the Invention

The present invention relates to a winch, and more specifically to the drive housing for such a winch, and the apparatus and method of assembling the drive components of the winch in the housing.

2. Description of the Prior Art

The most relevant prior art known to the applicant herein is a winch manufactured by Warn Industries, Inc., of Kent, Wash., the assignee of the present invention. That winch comprises a cable winding drum supported on each end by two housings, namely a main drive housing containing the drive components of the winch, and an opposite idler housing. These two housings each have forwardly facing contact surfaces which fit against a bracket on a bumper or other support structure to which the winch is mounted and are secured thereto. This winch further comprises a motor which transmits power through a speed reducing gear transmission to a first drive cam having an axially facing cam surface which engages an axially facing cam face of a second driven cam which in turn through a further speed reducing transmission drives the cable winding drum of the winch. A clutch-brake assembly is operatively connected to the two cams, this assembly comprising a first shoe connected to the first cam to rotate therewith, a second shoe connected to the second cam to rotate therewith, and a ratchet plate positioned between the two shoes.

When a winch is mounted to a support bracket at the front bumper location of an automobile, it is quite common that the winch be required to perform a variety of tasks, such as dragging a large object while the vehicle is stationary, or actually moving the vehicle itself by attaching the free end of the winch cable to a stationary object and reeling in the cable to pull the vehicle toward that object. The rather substantial tension loads exerted on the cable are transmitted to the winch drum, which in turn transmits these loads through the end housing structure to the vehicle bumper bracket. Thus the drive housing of the winch, in addition to its function of containing and providing adequate support to the drive components of the winch, must function as a rugged structural member capable of withstanding substantial force.

In the prior art winch described above, the drive housing is constructed of a main housing section having substantially its entire outwardly facing side portion open, and a large side cover plate to close this opening. The side plate is secured to the main housing section by a number of bolts spaced around the periphery of the side plate. To assemble the components of the winch, the main housing section and its side plate are initially separate, and the various drive components are inserted laterally into the main drive housing section, after which the side plate is bolted into place. To provide adequate structural strength for the assembled housing, fifteen bolts and two locking pins are required to secure the side plate to the main drive housing section and relatively thick walls in addition to structural reinforcing is required for the main housing section. While the prior art winch described above operates satisfactorily, there is still a need to simplify the structure, improve the load carrying capacity of the housing relative to its weight, and provide for the more convenient assembly of the winch components.

Thus, it is an object of the present invention to supply such a need.

SUMMARY OF THE INVENTION

The winch of the present invention comprises a drum mounted for rotation about a longitudinal axis. The drive end of the drum is mounted to a main drive housing, and the opposite idler end of the drum is mounted to an oppositely positioned idler housing. The main drive housing comprises a first lower main housing section having a box-like construction with integral front, rear and side walls, and a top opening, and further comprises a second upper section to close the top opening of the first section.

The lower main housing section has a first main axially aligned side opening to receive in radial bearing relationship the drive end of the drum. It also has a secondary side opening spaced transversely from the first main side opening to receive an intermediate drive member positioned within the main housing section and insertable into the housing through the secondary side opening.

A retaining plate is positioned in the drive housing to engage the drive end of the drum and the intermediate drive member and is insertable into the main drive housing section through the open top thereof. This plate has a downwardly facing recess, whose edge engages a matching annular groove in the drive end of the drum and second opening means having an edge to engage a matching annular groove in the intermediate drive member, to secure the components in place.

In the preferred embodiment of the present invention, there is a main drive gear having a spline connection with the drive end of the drum, and this main drive gear is insertable through the top end of the housing to engage the drive end of the drum which is then inserted through its related access opening into the drive housing. The intermediate drive member has a spline connection with a second gear, which is insertable through the top opening and then engaged by the intermediate drive member which is moved through its related opening. First stage drive components, in the form of a first stage gear assembly are positioned in the upper housing section. The upper edge of the main drive housing section is formed with an upstanding lip which matches a groove in the lower edge of the upper housing section to provide for proper location of the two housings and also an adequate seal between them.

Other features of the present invention will become apparent from the following detailed description.

BRIEF DESCRIPTION OF THE DRAWINGS

FIGS. 4–9 are a series of isometric views showing the method of assembly of the winch of the present invention;

FIG. 10 is an isometric view of a retaining plate used to position and retain certain components of the winch in the drive housing;

DESCRIPTION OF THE PREFERRED EMBODIMENT

Figure 1:
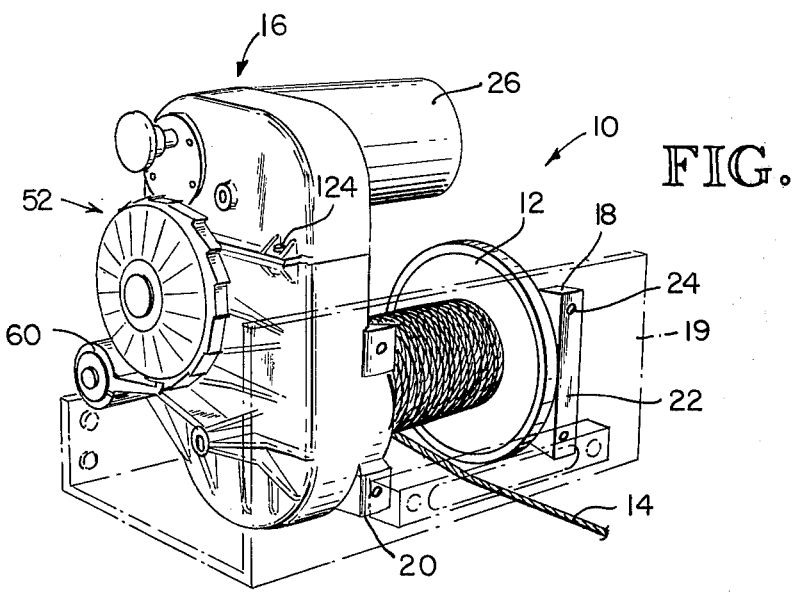
FIG. 1 is an isometric view of the winch of the present invention.

In the accompanying drawings there is shown a winch 10 comprising a drum 12 having a cable 14 wound thereon, and two end housings, namely a main drive housing 16 containing the drive components of the winch 10, and an opposite end housing 18. The winch 10, as shown herein, is particularly adapted to be mounted to a bracket 19 at the front bumper location of an automotive vehicle, and thus the two housings 16 and 18 each have a forwardly facing contact surface 20 and 22, respectively, facing the bracket 19 and also facing the direction in which the cable 14 extends to apply a force on a load.

In describing the winch 10, the term "left" shall denote proximity to the side of the winch 10 where the housing 16 is located, and the term "right" shall denote proximity to the housing 18. "Front" denotes the direction in which the cable 14 extends from the drum 12 in FIG. 1. The term "axial" refers to the axis of rotation of the drum 12.

Figure 11:
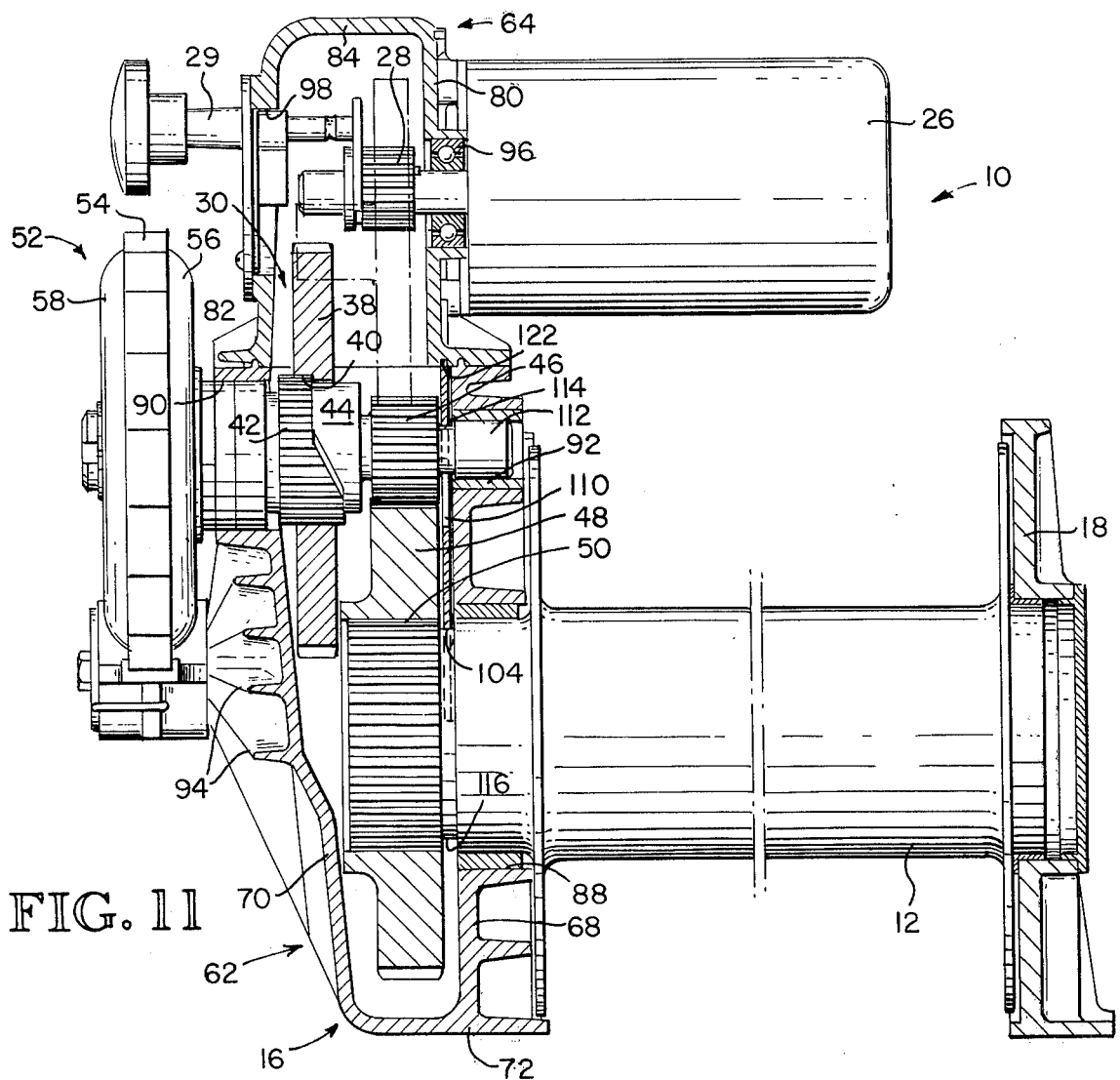
FIG. 11 is a longitudinal sectional view of the winch.
Figure 12:
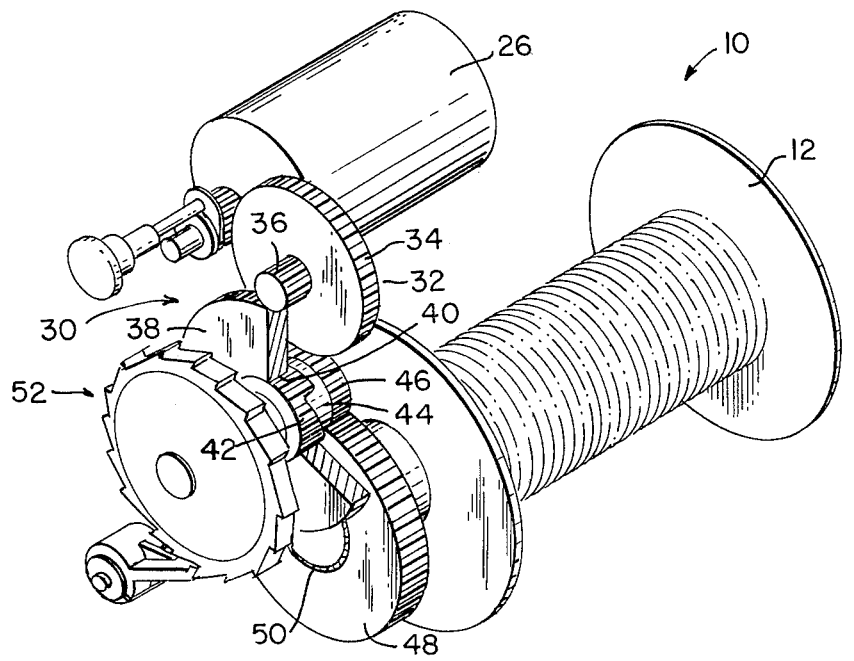
FIG. 12 is an isometric view of the winch, with the drive housing removed for purposes of illustration.

There is an electric motor 26 which is mounted to the upper portion of the main drive housing 16 to supply power to the drive assembly of the winch 10. This drive assembly can best be seen with reference to FIGS. 11 and 12. A pinion gear 28 is connected to the shaft of the motor 26, and is moved into and out of engagement by means of a manually operated clutch 29, to selectively supply power to a speed reducing gear transmission 30, which in turn powers the drum 12 to either reel in or pay out the cable 14. The power transmission 30 comprises a first cluster gear assembly 32 made up of a larger first stage gear 34 and a second pinion gear 36 fixedly attached to the gear 34. The pinion gear 36 engages a larger second stage gear 38 mounted by a spline connection 40 to a first drive cam member 42. There is a second drive cam member 44, axially aligned with the first cam member 42 and positioned just to the right thereof (as viewed from a position forwardly of the winch as shown in FIG. 1). The second drive cam member has a third pinion gear fixedly attached thereto, and this third pinion gear 46 meshes with a main drive gear 48 connected by a spline connection 50 to the drum 12.

Mounted to the left of the two cam members 42 and 44 and in axial alignment therewith is a brake-clutch assembly 52, made up of a center ratchet plate 54 and right and left disc-shaped shoes 56 and 58, respectively, positioned on opposite sides of the ratchet plate 54. The ratchet plate 54 carries friction material for frictional engagement with the shoes 56 and 58. A pawl 60 engages the ratchet plate 54 to permit it to rotate only in one direction.

Figure 2:
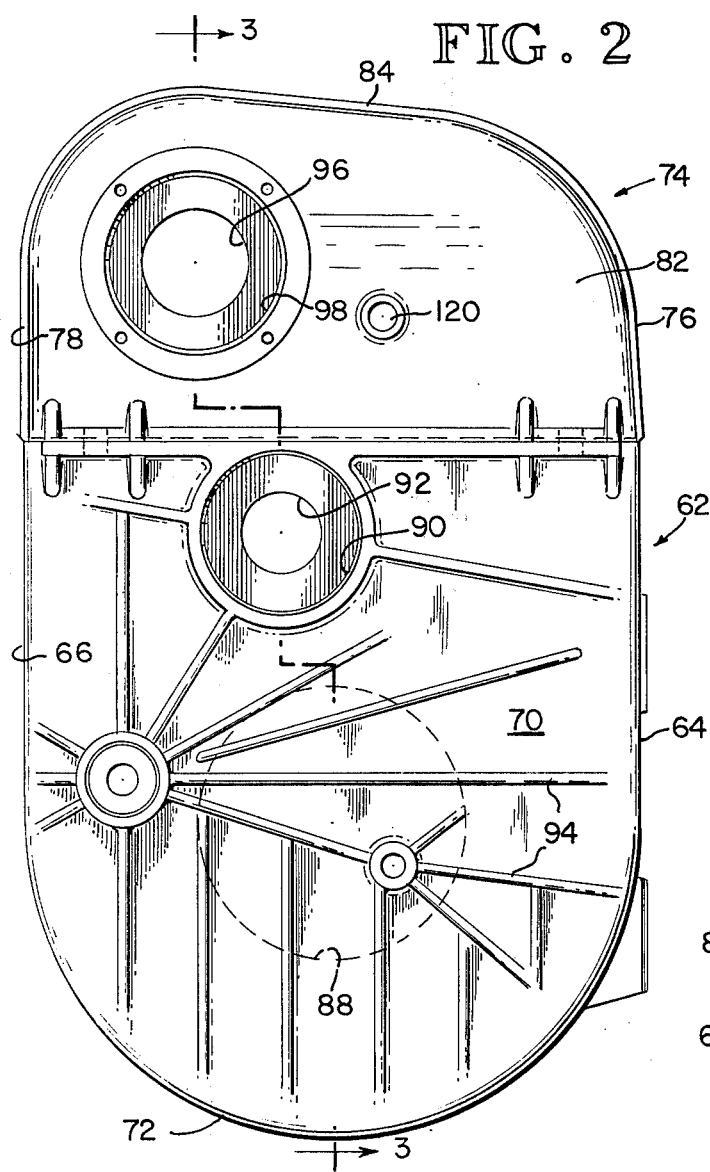
FIG. 2 is a side elevational view of the main drive housing of the winch of FIG. 1, without any drive components therein.
Figure 3:
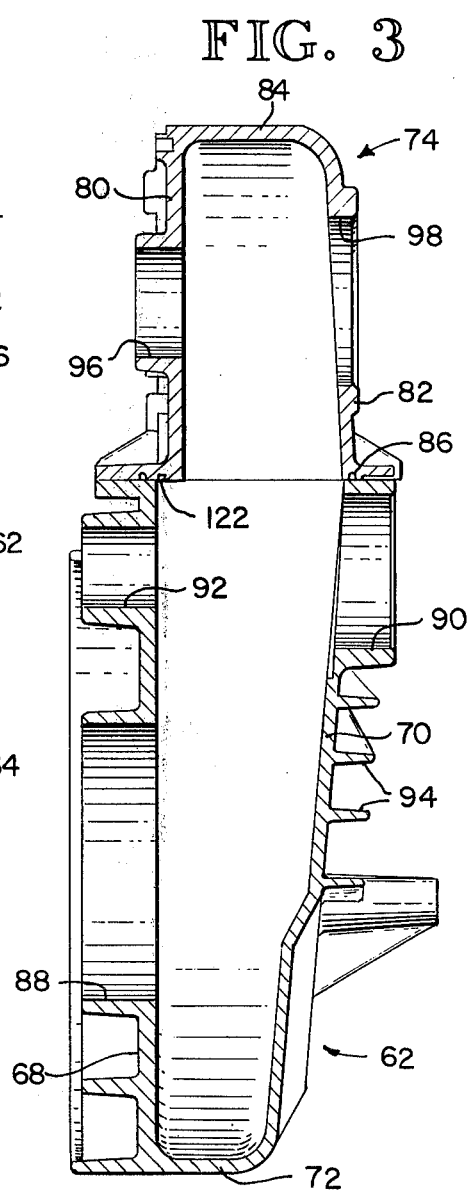
FIG. 3 is a longitudinal sectional view taken along line 3—3 of FIG. 2.

The main drive housing 16 will now be described with reference to FIGS. 2 and 3. There is a lower main housing section 62 integrally formed, as by a metal casting, and comprising a front wall 64, a back wall 66, right and left side walls 68 and 70 and a rounded bottom wall portion 72. The top of the lower housing 62 is formed as an opening, which is closed by an upper housing section 74, made up of a front wall 76, a rear wall 78, right and left side walls 80 and 82, respectively, and a top wall 84. The lower edge of the upper section 74 is formed with a downwardly facing open groove which interfits with a matching upstanding lip on the upper edge of the main bottom housing section 62. This groove and lip are collectively designated 86 in FIG. 3.

Formed in the right side wall 68 of the lower main housing section 62 is a main axially aligned side opening 88 to receive in radial bearing relationship the drive end of the drum 12. Spaced transversely and upwardly from the opening 88 are a pair of axially aligned secondary side openings in the lower housing section 62, namely a larger left opening 90 and a smaller right opening 92. It will be noted that the right and left side walls 68 and 70 of the lower housing section 62 are formed with a number of integral reinforcing members, some of which are identified in the drawings by the numerical designation 94. The upper main housing section 74 has a pair of axially aligned through openings, namely a right opening 96 and a left opening 98.

With reference to FIGS. 4–9, the manner in which the components of the winch are assembled will now be described. In FIG. 4, it can be seen that the drum 12 is placed on end with its left drive end 100 facing upwardly. The lower main housing section 62 is positioned with the main side opening 88 over the splined end 100 of the drum 12. The main drive gear 48 is inserted through the top opening of the housing section 62 and aligned with the opening 88. Then the housing section 62 is lowered onto the drum 12 to cause the splined end 100 to enter the opening 88 and interfit with the main gear 48.

With reference to FIG. 5, the next step is to place a retaining plate 102 through the top opening of the lower housing section 62. This retaining plate 102 is particularly significant in the present invention and is shown in more detail in FIG. 10. The retaining plate 102 has a lower circular recess defined by an arcuate lower edge 104. At the upper portion of the retaining plate 102 is a retaining opening 106 comprising a lower access opening portion 108 of larger diameter, and an upper vertically aligned locking slot portion 110. The retaining plate 102 is provided with a pair of dimples 111 to space the plate 102 a short distance from the housing side wall 68.

The retaining plate 102 is initially positioned in the housing section 62 so that the access hole portion 108 is aligned with the two secondary openings 90 and 92. In FIG. 6 the retaining plate 102 is shown in position within the housing section 62. Next, the two cam members 42 and 44 and the clutch-brake assembly 52 as one total assembly is brought into alignment with the left hole 90, and the two cam members 42 and 44 are moved through the hole 90. Just prior to this, the gear 38 is inserted through the top opening of the housing section 62, and the cam members 42 and 44 are inserted through the gear 38 to spline the gear 38 onto the cam member 42. The extreme right end portion 112 of the cam member 44 fits into the opening 92, and the pinion gear 46 meshes with the main gear 48.

With this step completed, the retaining plate 102 is moved downwardly a short distance so that the side edges of a locking slot 110 move into engagement with an annular groove 114 formed in the right sides of the cam member 44, just to the right of the pinion gear 46. Also, by so lowering the retaining plate, the lower arcuate edge 104 comes into engagement with an annular slot 116 in the drive end of the drum 12 just to the right of the splined portion 100 thereof. Thus, the retaining plate 102 holds the drive end 100 of the drum 12 in place in the housing 62, and also retains the assembly of the two cams 42 and 44 and the brake-clutch assembly 52 in place.

Next, with reference to FIG. 8, the drive components positioned in the upper housing section 74 are inserted into place. Specifically, the manual clutch 29 is inserted through the hole 98, the cluster gear assembly 32 is put in position and retained by a pin 118 inserted through aligned openings in the side walls 80 and 82, and one such opening being shown at 120. The motor 26 is attached to the housing section 74 by conventional means.

With reference to FIG. 9, the next step is to lower the upper housing section 74 onto the lower section 62 so that the matching lip and groove 86 come into engagement. It will be noted that there is a small transversely extending slot 122 into which the upper edge of the retaining plate 102 fits when the two sections 74 and 62 are brought together, so as to properly locate and retain the upper end of the retaining plate 102. Three bolts 124 are used to secure the upper housing section 74 to the lower section 62. The right idler housing 18 is mounted to the right end of the drum 12 at the time of installation onto the bracket 19, this being accomplished simply by slipping the housing 18 onto the end of the drum 12.

With the winch 10 so assembled and mounted to the mounting bracket 19, the box-like construction of the lower housing section 62 provides a structurally strong, integrally formed housing section which is well able to withstand the rather substantial forces imparted thereto by operation of the winch 10.

What is claimed is:
1. A winch, comprising:
   a. a drum mounted for rotation about a longitudinal axis and having a drive end and an idler end,
   b. an idler end support housing for the idler end of the drum,
   c. a drive end support housing for the drive end of said drum, said drive end support housing comprising:
      1. a bottom section of box-like construction with integral front, rear and side walls, and a top opening,
      2. a top section to enclose the top opening of the bottom section,
   d. the bottom section having:
      1. a main axially aligned side opening to receive in radial bearing relationship the drive end of said drum,
      2. a secondary side opening spaced transversely from the main side opening,
   e. an intermediate drive member positioned within the bottom section in driving engagement with the drive end of the drum, said intermediate drive member being mounted in said secondary side opening in radial bearing relationship,
   f. a retaining plate positioned in the bottom section and extending vertically from said top opening in a transverse direction into said top section, said retaining plate having:
      1. a downwardly facing recess having an edge portion to engage a matching annular groove in the drive end of the drum and restrain axial movement of said drum relative to the bottom section,
      2. a retaining plate opening having an edge portion to engage a matching annular groove in the intermediate drive member so as to retain the intermediate drive member axially in the bottom section, whereby the drive end of the drum and the intermediate drive member can be inserted axially into the bottom section and placed into driving engagement with each other, and the retaining plate inserted vertically through the top opening of the bottom section and into engagement with the drive end of the drum and the intermediate drive member, and with the bottom section maintaining its integral box-like construction to withstand forces exerted thereon.

2. The winch as recited in claim 1, wherein one of said recess and retaining opening has an expanded access portion for insertion of one of the drive end of the drum and the intermediate drive member, and an upper locking slot portion, whereby said retaining plate can be lowered into locking engagement after insertion of said one of the drive end of the drum and the intermediate drive member.

3. The winch as recited in claim 2, wherein the other of said recess and retaining plate opening has a downwardly facing edge portion to engage the other of the drive end of the drum and the intermediate drive member in locking relationship.

4. The winch as recited in claim 1, wherein said retaining plate opening has an expanded access portion to receive the intermediate drive member and an upper locking slot portion having an edge portion to engage the annular groove in the intermediate drive member when said retaining plate is lowered into its locking position, and said downwardly facing recess has an edge portion to engage the matching annular groove in the drive end of the drum.

5. The winch as recited in claim 1, wherein there is a main drive gear having a spline connection with the drive end of the drum, and having an operative power engaging connection with the intermediate drive member, whereby said main drive gear is insertable through the top opening of the bottom section to be engaged by the drive end of the drum being inserted through the main side opening.

6. The winch as recited in claim 5, wherein there is an intermediate drive gear having a spline connection with the intermediate drive member and insertable through the top opening of the bottom section, to be engaged by the intermediate drive member being inserted through the secondary side opening.

7. The winch as recited in claim 1, wherein there is an intermediate drive gear having a spline connection with the intermediate drive member and insertable through the top opening of the bottom section, to be engaged by the intermediate drive member being inserted through the secondary side opening.

8. The winch as recited in claim 1, wherein said top section has a retaining slot to receive an upper edge of said retaining plate and properly locate the upper edge of said retaining plate in the drive end support housing.

9. The winch as recited in claim 1, wherein:
   a. said retaining plate opening has and expanded access portion to receive the intermediate drive member and an upper locking slot portion having an edge portion to engage the annular groove in the intermediate drive member when the retaining plate is lowered into its locking position,
   b. there is a main drive gear having a spline connection with the drive end of the drum, and having an operative power engaging connection with the intermediate drive member, whereby said main drive gear is insertable through the top opening of the bottom section to be engaged by the drive end of the drum being inserted through the main side opening, c. there is an intermediate drive gear having a spline connection with the intermediate drive member and insertable through the top opening of the bottom section, to be engaged by the intermediate drive member being inserted through the secondary side opening, and d. said top section has a retaining slot to receive an upper edge of said retaining plate and properly locate the upper edge of said retaining plate in the drive end support housing.

10. A method of assembling winch components, said method comprising:

a. providing a drive end support housing having a bottom section of box-like construction with integral front, rear and side walls, and a top opening, and a top section to enclose the top opening of the bottom section, b. inserting through a main axially aligned side opening in the bottom section a drive end of a winch drum, to be received in said main side opening in radial bearing relationship, c. inserting through a secondary side opening in the bottom section at a location spaced transversely from the main side opening an intermediate drive member to be positioned within the bottom section in radial bearing relationship in the secondary side opening, and d. inserting a retaining plate through the top opening of the bottom section to engage with a downwardly facing recessed edge portion of the retaining plate an annular groove in the drive end of the winch drums so as to restrain axial movement of the winch drum relative to the bottom section, and also engaging with an edge portion of an opening in the retaining plate a matching annular groove in the intermediate drive member so as to retain the intermediate drive member axially in the bottom section, whereby the winch drum and intermediate drive member are properly retained within the bottom section and the bottom section maintains its integral box-like construction to withstand force loads imparted thereto.

11. The method as recited in claim 10, wherein prior to inserting the drive end of the winch drum into the bottom section, a main drive gear is inserted through the top opening of the bottom section and placed in alignment with the main side opening, and the drive end of the winch drum is then inserted into engagement with said main gear.

12. The method as recited in claim 11, wherein an intermediate drive gear is inserted through the top opening of the bottom section and placed in alignment with the secondary side opening, and the intermediate drive member is then inserted through the intermediate drive gear to be in engagement therewith.

13. The method as recited in claim 10, wherein an intermediate drive gear is inserted through the top opening of the bottom section and placed in alignment with the secondary side opening, and the intermediate drive member is then inserted through the intermediate drive gear to be in engagement therewith.

14. The method as recited in claim 10, wherein initial drive component means is inserted into the top section to be mounted therein, after which the top section is inserted onto the bottom section with the initial drive component means in the top section coming into engagement with those in the bottom section.

15. The method as recited in claim 10, wherein a top edge of said retaining plate is engaged by a slot in said top section so as to locate the retaining plate with respect to said top section.

16. The method as recited in claim 10, wherein:

a. prior to inserting the drive end of the winch drum into the bottom section, a main drive gear is inserted through the top opening of the bottom section and placed in alignment with the main side opening, and the drive end of the winch drum is then inserted through the main side opening and into engagement with said main gear, b. an intermediate drive gear is inserted through the top opening of the bottom section and placed in alignment with the secondary side opening, and the intermediate drive member is then inserted through the intermediate drive gear to be in engagement therewith, c. the intermediate drive member is also inserted through an expanded opening portion of the opening in the retaining plate, after which the retaining plate is lowered to engage the intermediate drive member with a locking slot portion of the expanded opening portion for proper retention, d. initial drive component means is inserted into the top section to be mounted therein, after which the top section is inserted onto the bottom section with initial drive component means in the top section coming into engagement with those in the bottom section, and d. a top edge of the retaining plate is engaged by a slot in the top section so as to locate the retaining plate with respect to said top section.

17. A method of assembling winch components, said method comprising:

a. providing a drive end support housing having a bottom section of box-like construction with integral front, rear and side walls, and a top opening, and a top section to enclose the top opening of the bottom section, b. inserting through a main axially aligned side opening in the bottom section a drive end of a winch drum, to be received in said main side opening in radial bearing relationship, c. inserting through a secondary side opening in the bottom section at a location spaced transversely from the main side opening an intermediate drive member to be positioned within the bottom section in radial bearing relationship in the secondary side opening, and d. inserting a retaining plate through the top opening of the bottom section to engage with a downwardly facing recessed edge portion of the retaining plate an annular groove in the drive end of the winch drum so as to restrain axial movement of the winch drum relative to the bottom section, and also engaging with a locking slot portion of an opening in the retaining plate, a matching annular groove in the intermediate drive member when the retaining plate is lowered so as to retain the intermediate drive member axially in the bottom section, whereby the winch drum and intermediate drive member are properly retained within the bottom section, and the bottom section maintains its integral box-like construction to withstand force loads imparted thereto.

* * * * *

UNITED STATES PATENT OFFICE
CERTIFICATE OF CORRECTION

Patent No. 4,033,552                Dated    July 5, 1977

Inventor(s)    ENCHO JANAKI KUZAROV

It is certified that error appears in the above-identified patent and that said Letters Patent are hereby corrected as shown below:

Column 4, line 65, after "116" insert - - formed - - .

Column 6, line 13, after "retaining" insert - - plate - - .

Column 6, line 31, delete "downwardly facing".

*Signed and Sealed this*

*Twenty-seventh* Day of *September 1977*

[SEAL]

Attest:

RUTH C. MASON
*Attesting Officer*

LUTRELLE F. PARKER
*Acting Commissioner of Patents and Trademarks*